United States Patent
Okita et al.

(10) Patent No.: US 9,638,345 B2
(45) Date of Patent: May 2, 2017

(54) VALVE APPARATUS

(71) Applicant: SMC Corporation, Chiyoda-ku (JP)

(72) Inventors: Yuzuru Okita, Tsukubamirai (JP); Tetsuro Maruyama, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 252 days.

(21) Appl. No.: 14/337,394

(22) Filed: Jul. 22, 2014

(65) Prior Publication Data

US 2015/0129791 A1 May 14, 2015

(30) Foreign Application Priority Data

Nov. 11, 2013 (JP) .................................. 2013-233348

(51) Int. Cl.
*F16K 31/122* (2006.01)
*F16K 7/14* (2006.01)

(52) U.S. Cl.
CPC ............ *F16K 31/1221* (2013.01); *F16K 7/14* (2013.01)

(58) Field of Classification Search
CPC .................................. F16K 31/1221; F16K 7/14
See application file for complete search history.

(56) References Cited

U.S. PATENT DOCUMENTS

| | | | | |
|---|---|---|---|---|
| 2,638,306 A | * | 5/1953 | Fortune | F16K 41/12 251/335.2 |
| 5,924,441 A | * | 7/1999 | Leys | F16K 11/022 137/312 |
| 6,508,266 B2 | * | 1/2003 | Iritani | F16K 7/126 137/15.11 |
| 6,612,538 B2 | * | 9/2003 | Fukano | F16K 7/17 137/270 |

FOREIGN PATENT DOCUMENTS

| | | |
|---|---|---|
| JP | 2009-24780 A | 2/2009 |
| JP | 2009-150422 A | 7/2009 |
| JP | 4461087 | 5/2010 |
| JP | 2010-121689 | 6/2010 |
| JP | 4705490 | 6/2011 |

OTHER PUBLICATIONS

Rejection of the Application issued Jun. 19, 2015 in Korean Patent Application No. 10-2014-0118739 (with partial English language translation).

* cited by examiner

*Primary Examiner* — Jessica Cahill
*Assistant Examiner* — Daphne M Barry
(74) *Attorney, Agent, or Firm* — Oblon, McClelland, Maier & Neustadt, L.L.P.

(57) ABSTRACT

A valve apparatus is equipped with a diaphragm disposed displaceably in the interior of a body, and which opens and closes a fluid passage by separating away from and being seated on a valve seat, a conductive shaft arranged in a through hole that is formed substantially in the center of the diaphragm, and a grounding member for grounding the conductive shaft. Each of the body and the diaphragm is formed from a non-conductive material, and one end surface of the conductive shaft is exposed to the fluid passage.

9 Claims, 9 Drawing Sheets

VALVE APPARATUS

CROSS-REFERENCE TO RELATED APPLICATION

This application is based upon and claims the benefit of priority from Japanese Patent Application No. 2013-233348 filed on Nov. 11, 2013, the contents of which are incorporated herein by reference.

BACKGROUND OF THE INVENTION

Field of the Invention

The present invention relates to a valve apparatus equipped with a diaphragm, which opens and closes a fluid passage that establishes communication between a first port and a second port and through which a fluid flows.

Description of the Related Art

Heretofore, a valve apparatus has widely been used equipped with a body, in which there is formed a fluid passage that establishes communication between a first port and a second port and through which a fluid flows, and a diaphragm that opens and closes the fluid passage by separating away from or being seated on a valve seat formed in the body. In this type of valve apparatus, for example, in the event that a corrosive fluid (such as ozone gas or ultrapure water) is utilized as the pressure fluid, the diaphragm and the body, respectively, are constituted from a fluorine resin that is resistant to corrosion.

Notwithstanding, in the event that the body and the diaphragm are each constituted from such a fluorine resin, which is a non-conductive material, static electricity is generated as a result of friction between the diaphragm and the valve seat, or by friction between the diaphragm and the pressure fluid. In addition, when static electricity is accumulated in the diaphragm, dielectric breakdown (spark discharge) occurs which may cause damage to the diaphragm.

Thus, valve apparatus have been proposed that include mechanisms for preventing dielectric breakdown of the diaphragm. For example, in Japanese Patent No. 4705490, a technical concept is disclosed in which, in a diaphragm valve equipped with a diaphragm retainer having a non-conductive first resilient member for holding an outer edge of the diaphragm, and a second resilient member that is attached via a conductive sheet to the underside of the first resilient member, static electricity generated in the vicinity of the diaphragm retainer is led out to a ground wire via the conductive sheet.

Further, for example, in Japanese Patent No. 4461087, a technical concept is disclosed in which an anti-corrosive conductive member is arranged in a through hole that penetrates to the side of a fluid passage in the vicinity (outer edge) of a membrane of the diaphragm, and an o-ring is provided to effect sealing between the conductive member and a wall surface that constitutes the through hole, wherein static electricity that is generated in the diaphragm is led out to a ground wire via the conductive member.

Furthermore, in Japanese Laid-Open Patent Publication No. 2010-121689, a technical concept is disclosed in which a spiral shaped conductive film is formed on a side of a diaphragm that does not come into contact with the pressure fluid, and static electricity that is generated in the diaphragm is led out to ground via the conductive film.

SUMMARY OF THE INVENTION

However, with conventional technology, such as that of the aforementioned Japanese Patent No. 4705490, since each of the first resilient member and the second resilient member remains in contact with the pressure fluid, usable pressure fluids are limited to corrosion-free pressure fluids that do not cause corrosion of the first resilient member and the second resilient member. Further, since the conductive sheet is sandwiched between the first resilient member and the second resilient member, there is a possibility that the pressure fluid will leak out from a gap between the first resilient member and the conductive sheet, and from a gap between the second resilient member and the conductive sheet, together with the fact that the structure of the diaphragm retainer is complex, which leads to a rise in production costs. Furthermore, since the outer edge of the diaphragm, which is easily subjected to loads when the diaphragm is elastically deformed (flexed), is sandwiched and held by the first resilient member, there are concerns about the durability of the diaphragm retainer.

With the conventional technology of Japanese Patent No. 4461087, since the conductive member is arranged in the through hole that is formed on the outer edge of the diaphragm, in order to reliably suppress dielectric breakdown of the diaphragm, it is necessary for a plurality of conductive members to be provided along the circumferential direction of the diaphragm. However, in this case, since the number of parts making up the conductive members and the o-rings increases, production costs tend to rise.

With the conventional technology of Japanese Laid-Open Patent Publication No. 2010-121689, static electricity that is generated in the diaphragm is attracted to the conductive film and is led out to ground. However, since the conductive film is formed on a side of the diaphragm that does not come into contact with the pressure fluid, static electricity, which is generated inside the fluid flow path through which the pressure fluid flows, cannot be guided to the conductive film, and as a result, there is a concern that dielectric breakdown of the diaphragm cannot be suppressed reliably.

The present invention has been devised while taking into consideration the aforementioned problems, and has the object of providing a valve apparatus in which dielectric breakdown of a diaphragm can be suppressed reliably with a simple structure, and in which it is possible to achieve a reduction in manufacturing costs.

A valve apparatus according to the present invention includes a body including a fluid passage that establishes communication between a first port and a second port and through which a pressure fluid flows, a diaphragm disposed displaceably in the interior of the body, and which opens and closes the fluid passage by separating away from a valve seat and by being seated on the valve seat, a conductive shaft arranged in a through hole formed substantially in the center of the diaphragm, and a grounding member for grounding the conductive shaft, wherein each of the body and the diaphragm is formed from a non-conductive material, one end surface of the conductive shaft being exposed to the fluid passage.

According to the valve apparatus of the present invention, static electricity that is generated in the diaphragm is led out to the grounding member through the conductive shaft, which is arranged in the through hole formed substantially in the center of the diaphragm, and therefore, accumulation of static electricity in the diaphragm can be suppressed. Accordingly, dielectric breakdown of the diaphragm can be suppressed reliably with a simple structure, and a reduction in manufacturing costs can be achieved.

In the above-described valve apparatus, the conductive shaft may include a small diameter portion arranged in the through hole, and a large diameter portion disposed on another end of the small diameter portion, wherein an annular sealing projection, which contacts one surface of the large diameter portion and forms a seal between the large diameter portion and the diaphragm, may be formed on another surface of the diaphragm.

With such a structure, since the annular sealing projection, which forms a seal between the diaphragm and the large diameter portion, is formed on the other surface of the diaphragm, leakage of pressure fluid from the fluid passage can be suppressed.

In the above-described valve apparatus, the conductive shaft may include a small diameter portion arranged in the through hole, and a large diameter portion disposed on another end of the small diameter portion, wherein an annular resilient member, which forms a seal between the large diameter portion and the diaphragm, is interposed between another surface of the diaphragm and one surface of the large diameter portion.

With such a structure, since the annular resilient member, which forms a seal between the diaphragm and the large diameter portion, is interposed between another surface of the diaphragm and the one surface of the large diameter portion, leakage of pressure fluid from the fluid passage can be suppressed.

In the above-described valve apparatus, the conductive shaft may be made of polyphenylene sulfide containing carbon fibers, or may be made of a metal material having corrosion resistance. In this case, even if a corrosive fluid is used as the pressure fluid, corrosion of the conductive shaft can be suppressed, and static electricity that is generated in the diaphragm can be reliably eliminated.

The above-described valve apparatus may further include a conductive member disposed on an outer surface of an outer edge of the diaphragm, and a conductive retainer that retains the outer edge of the diaphragm in a condition of being electrically connected with the conductive member, wherein the grounding member grounds the conductive member through the retainer, and a portion of the conductive member is exposed to the fluid passage.

According to such a structure, static electricity, which is generated in the diaphragm, is led out to the grounding member via the retainer and the conductive member disposed on the outer surface of the outer edge of the diaphragm. Therefore, dielectric breakdown of the diaphragm can be suppressed more reliably.

A valve apparatus according to the present invention includes a body including a fluid passage that establishes communication between a first port and a second port and through which a pressure fluid flows, a diaphragm disposed displaceably in the interior of the body, and which opens and closes the fluid passage by separating away from a valve seat and by being seated on the valve seat, a conductive member disposed on an outer surface of an outer edge of the diaphragm, a conductive retainer that retains the outer edge of the diaphragm in a condition of being electrically connected with the conductive member, and a grounding member configured to ground the conductive member through the retainer, wherein each of the body and the diaphragm is formed from a non-conductive material, and a portion of the conductive member is exposed to the fluid passage.

According to the valve apparatus of the present invention, static electricity that is generated in the diaphragm is led out to the grounding member via the retainer and the conductive member disposed on the outer surface of the outer edge of the diaphragm, and therefore, accumulation of static electricity in the diaphragm can be suppressed. Accordingly, dielectric breakdown of the diaphragm can be suppressed reliably with a simple structure, and a reduction in manufacturing costs can be achieved.

In the above-described valve apparatus, the conductive member may be made of carbon fibers. In this case, static electricity that is generated in the diaphragm can be guided efficiently to the retainer through the conductive member.

According to the present invention, since static electricity that is generated in the diaphragm is led out to the grounding member via the conductive shaft or the conductive member, dielectric breakdown of the diaphragm can be suppressed reliably with a simple structure, and a reduction in manufacturing costs can be achieved.

The above and other objects, features and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Below, preferred embodiments of a valve apparatus according to the present invention will be presented and described with reference to the accompanying drawings.

First Embodiment

Figure 1:
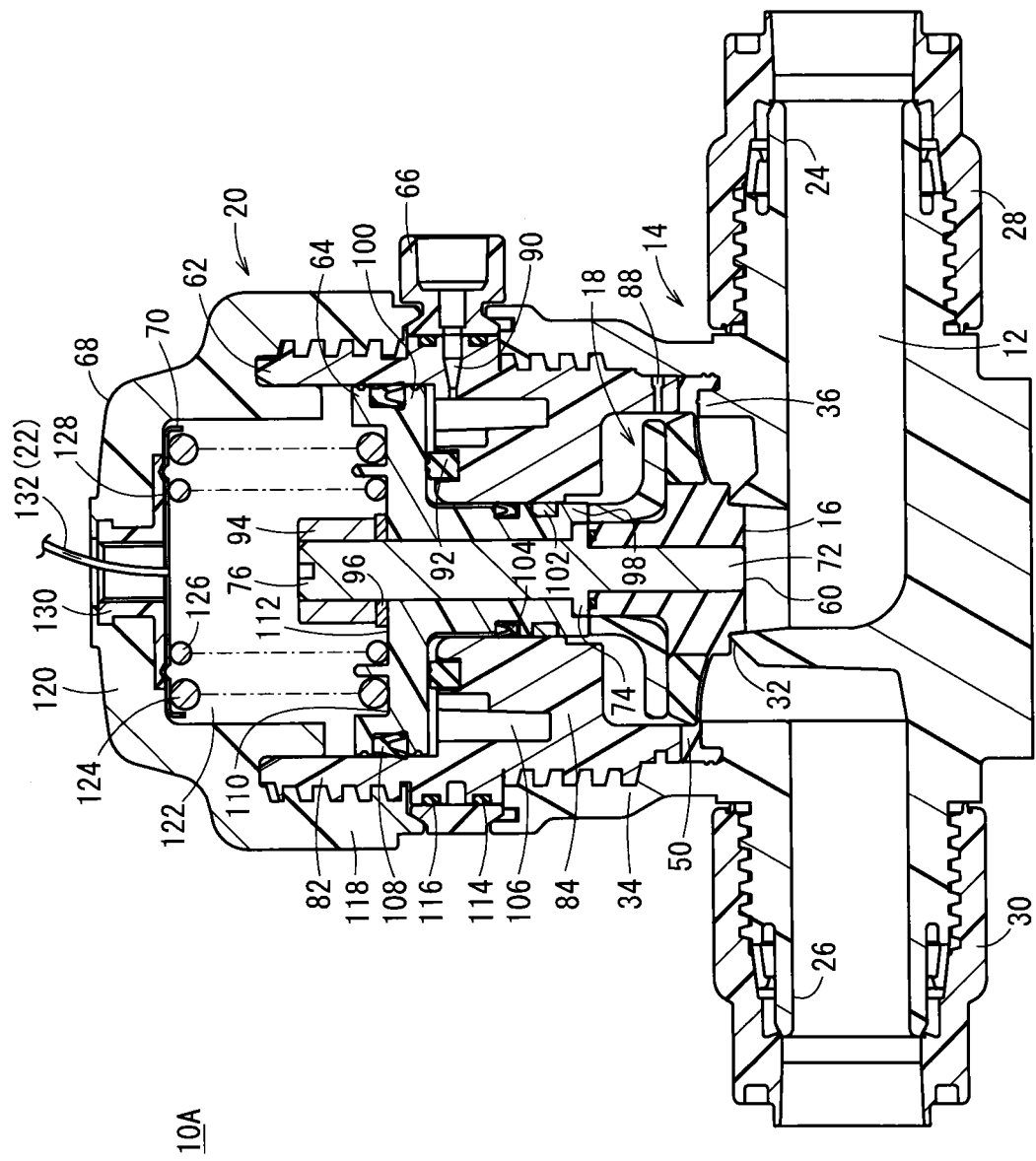
FIG. 1 is a vertical cross-sectional view of a valve apparatus according to a first embodiment of the present invention.

As shown in FIG. 1, a valve apparatus 10A is constituted as a two-way valve, and comprises a body 14 including a fluid passage 12 through which a pressure fluid flows, a valve member 18 having a diaphragm 16 that opens and closes the fluid passage 12, an actuator 20 for operating the valve member 18, and a grounding member (grounding means) 22. A corrosive fluid (chemical liquid) such as ultrapure water or ozone gas, for example, is used as the pressure fluid. However, the pressure fluid may comprise fluids other than the aforementioned corrosive fluid.

The body 14 and the diaphragm 16 are made up from a non-conductive material. As the non-conductive material, for example, a fluorine resin such as Teflon (registered trademark) or the like, which is resistant to corrosion by the corrosive fluid, may be used. In this manner, in the event that the body 14 and the diaphragm 16 are constituted from a fluorine resin, a corrosive fluid can suitably and effectively be used as the pressure fluid.

In the body 14, there are formed a first port 24 through which the pressure fluid is introduced, a second port 26 through which the pressure fluid is discharged, and a fluid passage 12 that communicates between the first port 24 and the second port 26.

The first port 24 communicates with the inner bore of a non-illustrated tube that is attached by a first lock nut 28, and the second port 26 communicates with the inner bore of a non-illustrated tube that is attached by a second lock nut 30. A valve seat (seat member) 32 on which the diaphragm 16 is seated is formed in a wall portion that makes up the fluid passage 12.

The body 14 includes a cylindrical mounting part 34 on which the actuator 20 is mounted. On one end side of the inner circumferential surface of the mounting part 34, a diaphragm retainer 36 is provided, which retains an outer edge 50 of the diaphragm 16.

Figure 2:
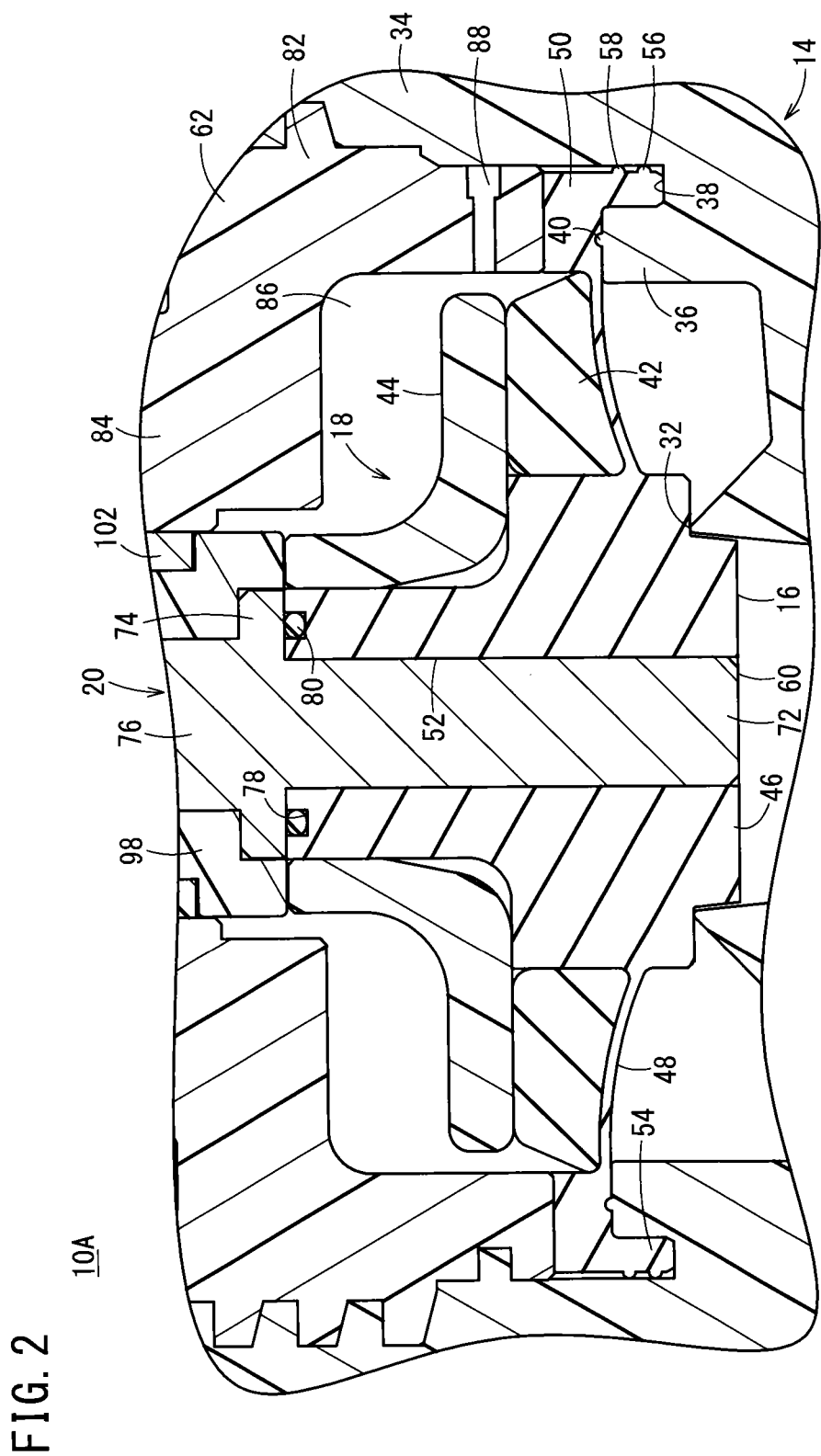
FIG. 2 is an enlarged cross-sectional view of a portion of the valve apparatus.

As shown in FIG. 2, the diaphragm retainer 36 extends in a radial inward direction from the inner circumferential surface of the mounting part 34, and projects toward the other end side of the mounting part 34 at a radial inner end portion thereof. Stated otherwise, an annular groove 38, which opens toward the other end side of the mounting part 34, is formed on the diaphragm retainer 36. Further, on a surface of the diaphragm retainer 36 that is directed toward the other end side of the mounting part 34, an annular sealing projection 40, which is semicircular shaped in cross section, is formed.

The valve member 18 includes the diaphragm 16, which is disposed displaceably in the interior of the mounting part 34 that makes up the body 14, a protective member 42 disposed on the diaphragm 16, and a retaining member 44 for holding the protective member 42. The diaphragm 16 includes a boss section 46 that makes up a central portion of the diaphragm 16 and extends in an axial direction of the mounting part 34, a thin-walled membrane section 48 that extends in a radial outward direction from the outer circumferential surface of the boss section 46, and the thick-walled outer edge 50.

Substantially in the center of the boss section 46, a through hole 52 is formed that penetrates along the axial direction of the mounting part 34. One end surface of the boss section 46 is capable of being seated on the valve seat 32. The membrane section 48 of the diaphragm 16 is capable of being elastically deformed, or in other words, is flexible.

The outer edge 50 of the diaphragm 16 extends in a radial outward direction from the outer circumference of the membrane section 48, and at the radial outward end thereof, projects toward one end side of the mounting part 34. Stated otherwise, on the outer edge 50 of the diaphragm 16, an annular protrusion 54 is formed, which is arranged in the annular groove 38 of the diaphragm retainer 36. A pair of annular sealing projections 56, 58, which have semicircular shapes in cross section and are separated mutually from each other, are formed on the outer circumferential surface of the annular protrusion 54.

The protective member 42, for example, is formed from an elastic material such as rubber or the like, and protects the membrane section 48 of the diaphragm 16 by being disposed on the other surface of the membrane section 48. The central part of the retaining member 44 is formed in a cylindrical shape, and one end of the retaining member 44 extends radially outward from the central part such that the diameter of the one end increases, so that the one end of the retaining member 44 covers the protective member 42 from the other side thereof.

The actuator 20 includes a conductive shaft 60, a retainer 62, a piston 64, a pilot joint 66, a bonnet 68, and a biasing mechanism 70. The conductive shaft 60 is constituted from a conductive resin or a metallic material, which is corrosion resistant with respect to the pressure fluid. As the conductive resin, for example, a PPS (polyphenylene sulfide) resin including carbon fibers may be used.

The conductive shaft 60 is disposed coaxially with the axis of the mounting part 34 that makes up the body 14, and includes a first small diameter portion 72 that is arranged in the through hole 52 of the diaphragm 16, a large diameter portion 74 disposed on the other end of the first small diameter portion 72, and a second small diameter portion 76 that constitutes the other end side of the conductive shaft 60.

Screw threads, which are formed on the outer surface of the first small diameter portion 72, are screw-engaged with screw threads formed on the inner circumferential surface of the through hole 52, to thereby fix the first small diameter portion 72. The outer diameter of the boss section 46 is substantially the same as the outer diameter of the large diameter portion 74. One end surface of the first small diameter portion 72 is exposed to the fluid passage 12. As understood from FIG. 2, in the present embodiment, the one end surface of the first small diameter portion 72 and the one end surface of the boss section 46 are coplanar. However, the one end surface of the first small diameter portion 72 may be positioned more to one side or the other side than the one end surface of the boss section 46.

Between the large diameter portion 74 and the boss section 46, a seal is established by an o-ring 80, which is a resilient member and arranged in an annular groove 78 formed on the other end surface of the boss section 46. The second small diameter portion 76 has an outer diameter that is somewhat greater than the outer diameter of the first small diameter portion 72.

The retainer 62, for example, is made from an arbitrary material such as a resin or the like, and includes an outer tubular portion 82, and an inner tubular portion 84 disposed integrally on an inner circumferential surface of one end side of the outer tubular portion 82. The outer tubular portion 82 and the inner tubular portion 84, respectively, are arranged coaxially with the conductive shaft 60. The overall length of the outer tubular portion 82 is greater (i.e., longer) than the overall length of the inner tubular portion 84.

Screw threads, which are engraved on one end side of the outer circumferential surface of the outer tubular portion 82, are screw-engaged with screw threads that are formed on the other end side of the inner circumferential surface of the mounting part 34, thereby fixing the outer tubular portion 82 to the mounting part 34. The one end surface of the outer tubular portion 82 abuts against the outer edge 50 of the diaphragm 16. More specifically, the outer edge 50 of the diaphragm 16 is gripped between the diaphragm retainer 36 and the outer tubular portion 82 of the retainer 62.

In this condition, the outer edge 50 of the diaphragm 16 is elastically deformable as a result of being pressed by the annular sealing projection 40 of the diaphragm retainer 36, and the pair of annular sealing projections 56, 58 of the outer edge 50 are elastically deformed upon abutment and being crushed against the side wall surface that makes up the annular groove 38. Accordingly, the seal between the diaphragm 16 and the body 14 can be enhanced. Moreover, on the end of the outer tubular portion 82, a ventilation hole 88 is formed, which communicates between the exterior and a valve chamber 86 that is formed between the diaphragm 16 and the inner tubular portion 84.

At a midway location on the outer tubular portion 82, a pilot port 90 is formed for introducing and discharging a pilot fluid (pressure fluid). Screw threads for attachment and installation of the bonnet 68 are engraved on the outer circumferential surface of the other end side of the outer tubular portion 82. A piston damper 92 is mounted through an annular groove on the other end surface of the inner tubular portion 84.

The piston damper 92, for example, is formed in a ring shape from a resilient material, and projects a predetermined height from the annular groove toward the bonnet 68. By providing such a piston damper 92, vibrations, which occur when the diaphragm 16 is seated on the valve seat 32, can be suppressed.

The piston 64 is constituted, for example, from a metal material or a conductive resin. An insertion hole through which the conductive shaft 60 is inserted is formed in the piston 64. One end side of the insertion hole is expanded in diameter so as to enable the large diameter portion 74 of the conductive shaft 60 to be disposed therein. More specifically, by tightening of a nut 94, which is screw-engaged with threads formed on the other end of the second small diameter portion 76, the piston 64 is gripped between a washer 96 and the large diameter portion 74. In this condition, the wall surface that makes up the insertion hole of the piston 64 is kept in contact with the outer circumferential surface of the second small diameter portion 76 of the conductive shaft 60. Stated otherwise, the piston 64 is connected electrically to the conductive shaft 60. Moreover, both the nut 94 and the washer 96 are constituted from a metal material.

The piston 64 includes a piston rod 98 disposed in an interior hole of the inner tubular portion 84, and a piston main body 100 disposed on the other end of the piston rod 98, and which is slidable along an inner circumferential surface of the outer tubular portion 82. The retaining member 44 abuts against one end surface of the piston rod 98. A wear ring 102 is mounted through an annular groove on an outer circumferential surface of the piston rod 98.

The wear ring 102 slides on the inner circumferential surface of the inner tubular portion 84 when the piston 64 is displaced in the axial direction. Consequently, the piston 64 is guided with high precision along the axial direction. Further, at a location that is closer to the other end side of the piston rod 98 than the wear ring 102, a rod packing 104 is mounted through an annular groove on the outer circumferential surface of the piston rod 98.

A piston packing 108 is mounted through an annular groove on an outer circumferential surface of the piston main body 100. On the other surface of the piston main body 100, there are formed an annular recess 110, and a circular recess 112 positioned on a more inward side than the annular recess 110. More specifically, as can be understood from FIG. 1, a circular partition wall is formed between the annular recess 110 and the circular recess 112.

The pilot joint 66 is gripped between the body 14 and the bonnet 68, and enables introduction and discharging of a pilot fluid to and from a pilot chamber 106 through the pilot port 90 that is formed in the outer tubular portion 82. The pilot chamber 106 comprises a space formed by an outer surface of the piston 64 (i.e., the outer circumferential surface of the piston rod 98 and one surface of the piston main body 100), the inner circumferential surface of the outer tubular portion 82, and the outer surface of the inner tubular portion 84. Further, between the pilot joint 66 and the outer tubular portion 82, a seal is effected by o-rings 114, 116, which are arranged, respectively, in a pair of annular grooves formed on the outer tubular portion 82.

The bonnet 68 is formed in a bottomed tubular shape from an arbitrary material such as a resin or the like, and includes an open attachment section 118 constituting one end side thereof, and a support section 120 constituting the other end side thereof and which supports the biasing mechanism 70. The bonnet 68 is fixed to the retainer 62 by screw-engagement of screw threads, which are engraved on the inner circumferential surface of the attachment section 118, with screw treads formed on the other end side of the outer circumferential surface of the outer tubular portion 82. A chamber 122, in which the biasing mechanism 70 is disposed, is formed between the bonnet 68 and the piston 64. The chamber 122 communicates with the exterior through a non-illustrated ventilation hole.

The biasing mechanism 70 includes a first spring 124 and a second spring 126, which bias the piston 64 toward the diaphragm 16, a plate-shaped spring seat 128 that retains the first spring 124 and the second spring 126, and a bracket 130, which is fixed in a state of being disposed in a hole formed in the center of the support section 120 and serves to support the spring seat 128. The first spring 124, the second spring 126, and the spring seat 128 are each constituted from a metal material.

Each of the first spring 124 and the second spring 126, for example, is constituted as a compression coil spring, and the outer diameter of the first spring 124 is greater than the outer diameter of the second spring 126. One end of the first spring 124 is fixed in the annular recess 110, and the other end thereof is fixed on the spring seat 128. One end of the second spring 126 is fixed in the circular recess 112, and the other end thereof is fixed on the spring seat 128.

The grounding member 22 includes a ground wire 132, which is connected electrically to the spring seat 128 through a hole formed in the bracket 130. The ground wire 132 is grounded at a location outside of the valve apparatus 10A. In the present embodiment, the conductive shaft 60, the piston 64, the first spring 124, the second spring 126, and the spring seat 128, respectively, are constituted from conductive materials and are connected electrically to each other. Therefore, the conductive shaft 60 is grounded by way of the ground wire 132.

The valve apparatus 10A according to the present embodiment is constructed basically as described above. Operations and advantages of the embodiment will be described below. A valve-closed condition, in which the diaphragm 16 is seated on the valve seat 32 and communication through the fluid passage 12 is blocked, will be described as an initial state (see FIG. 1).

In the initial state, the piston 64 is pressed to one side (a side opposite from the side on which the spring seat 128 is positioned) under the elastic force of the first spring 124 and the second spring 126, whereby the diaphragm 16 is placed in a valve-closed state in which the diaphragm 16 is moved to the one side through the conductive shaft 60 and is seated on the valve seat 32. Therefore, in this state, the pressure fluid supplied to the first port 24 is prevented by the diaphragm 16 from flowing to the second port 26. Further, in the initial state, a pilot fluid is not supplied to the pilot chamber 106.

Next, for placing the valve apparatus 10A in a valve-open condition, a pilot fluid is supplied from a non-illustrated fluid supply source to the pilot chamber 106 through the pilot joint 66. Upon supply of the pilot fluid, the pressure in the pilot chamber 106 rises, and the piston 64 is displaced toward the other side (the side on which the spring seat 128 is positioned) in opposition to the respective elastic forces of the first spring 124 and the second spring 126. Accordingly, the conductive shaft 60 and the diaphragm 16 are displaced together integrally to the other side. At this time, the membrane section 48 of the diaphragm 16 undergoes flexure.

Figure 3:
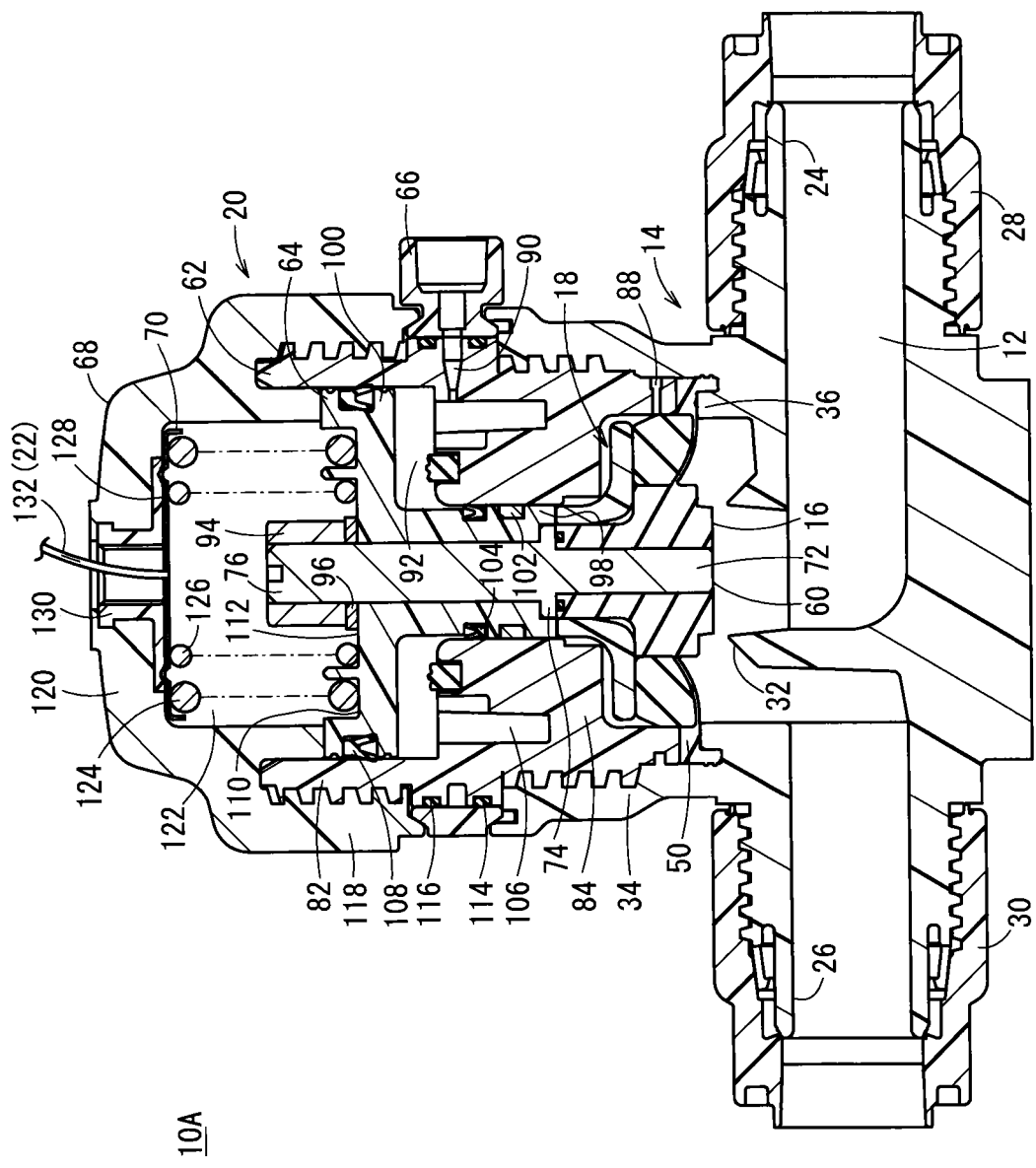
FIG. 3 is a vertical cross-sectional view showing an open condition of the valve apparatus of FIG. 1.

Consequently, as shown in FIG. 3, the diaphragm 16 moves away from the valve seat 32, whereupon the blocked state of the fluid passage 12 is released. As a result, the supplied pressure fluid begins to flow from the first port 24 to the second port 26. In addition, the piston 64 is displaced until the outer edge of the piston 64 comes into abutment against the bonnet 68, whereupon displacement of the piston 64 is stopped, and a valve-open condition in which the diaphragm 16 is completely open is brought about.

Then, in the case that the valve apparatus 10A is to be returned to the valve-closed condition, supply of the pilot fluid to the pilot chamber 106 is suspended. When supply of the pilot fluid is stopped, the pressure in the pilot chamber 106 decreases, and the piston 64 is displaced to the one side by the respective elastic forces of the first spring 124 and the second spring 126. Accordingly, the conductive shaft 60 and the diaphragm 16 are displaced together integrally to the one side. At this time, the membrane section 48 of the diaphragm 16 undergoes flexure. In addition, by abutment of the piston 64 against the piston damper 92, displacement of the piston 64 is stopped, and shocks and shock noises of the piston 64 with respect to the retainer 62 are suitably buffered. Further, at the same time, by seating of the diaphragm 16 on the valve seat 32, a valve-closed condition is brought about in which the state of communication of the fluid passage 12 is blocked.

According to the present embodiment, in the valve apparatus 10A which is constructed as described above, both the body 14 and the diaphragm 16, respectively, are constituted from a fluorine resin, which is a non-conductive material. As a result of being constituted in this manner, generation of static electricity tends to occur on one surface of the diaphragm 16 due to friction between the diaphragm 16 and the valve seat 32, or by friction between the diaphragm 16 and the pressure fluid.

However, even if static electricity is generated in the diaphragm 16, such static electricity (electrical charge) is led out to the ground wire 132 through the conductive shaft 60, the piston 64, the first spring 124 (the second spring 126), and the spring seat 128. Therefore, accumulation of static electricity in the diaphragm 16 can be suppressed. Accordingly, dielectric breakdown of the membrane section 48 of the diaphragm 16 can be suppressed reliably with a simple structure, and a reduction in manufacturing costs can be achieved.

Further, since the o-ring 80, which forms a seal between the diaphragm 16 and the large diameter portion 74, is interposed between the other end surface of the boss section 46 and the one surface of the large diameter portion 74, leakage of pressure fluid from the fluid passage 12 and flowing thereof into the valve chamber 86 can be suppressed.

Furthermore, since the conductive shaft 60 is constituted from polyphenylene sulfide containing carbon fibers or from a corrosion-resistant metal material, even if a corrosive fluid is used as the pressure fluid, corrosion of the conductive shaft 60 can be suppressed, and static electricity that is generated in the diaphragm 16 can be eliminated reliably.

Figure 4:
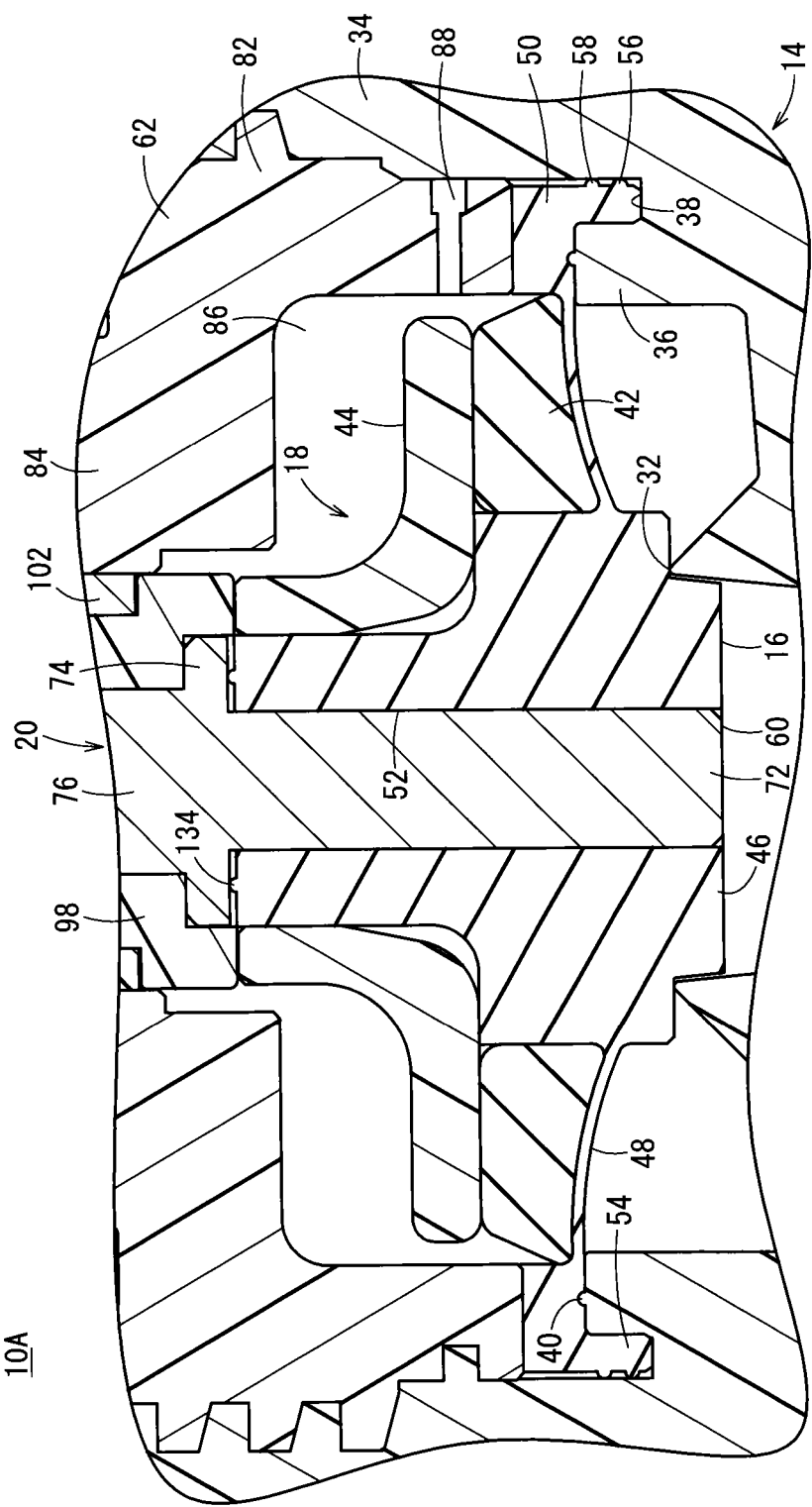
FIG. 4 is an enlarged cross-sectional view of a portion of a modification of the valve apparatus.

The valve apparatus 10A according to the present embodiment is not limited to the structure described above. For example, as shown in FIG. 4, instead of the aforementioned o-ring 80, the valve apparatus 10A may be formed with an annular sealing projection 134, which has a semicircular shape in cross section, on the other end surface of the boss section 46 of the diaphragm 16.

The annular sealing projection 134 is elastically deformable by coming into abutment against the one surface of the large diameter portion 74 and being pressed and crushed by the large diameter portion 74. Consequently, since a seal is formed by the annular sealing projection 134 between the diaphragm 16 and the large diameter portion 74, leakage of pressure fluid from the fluid passage 12 and flowing thereof into the valve chamber 86 can be suppressed. In addition, since the annular sealing projection 134 is formed integrally with the boss section 46, compared with the aforementioned structure in which the o-ring 80 is disposed in the annular groove 78, the number of parts can be reduced. Thus, manufacturing costs for the valve apparatus 10A can further be reduced.

The structure of the annular sealing projection 134 shown in FIG. 4 can be adopted in a valve apparatus 10B according to a second embodiment and a valve apparatus 10C according to a third embodiment, to be described in detail below.

Second Embodiment

Next, a valve apparatus 10B according to a second embodiment of the present invention will be described with reference to FIGS. 5 through 7. Constituent elements of the valve apparatus 10B according to the present embodiment, which possess the same or similar functions and effects as corresponding elements of the above-described valve apparatus 10A, are denoted by the same reference characters, and detailed description of such features is omitted. The same convention applies to the third embodiment of the present invention, which will be discussed later.

Figure 5:
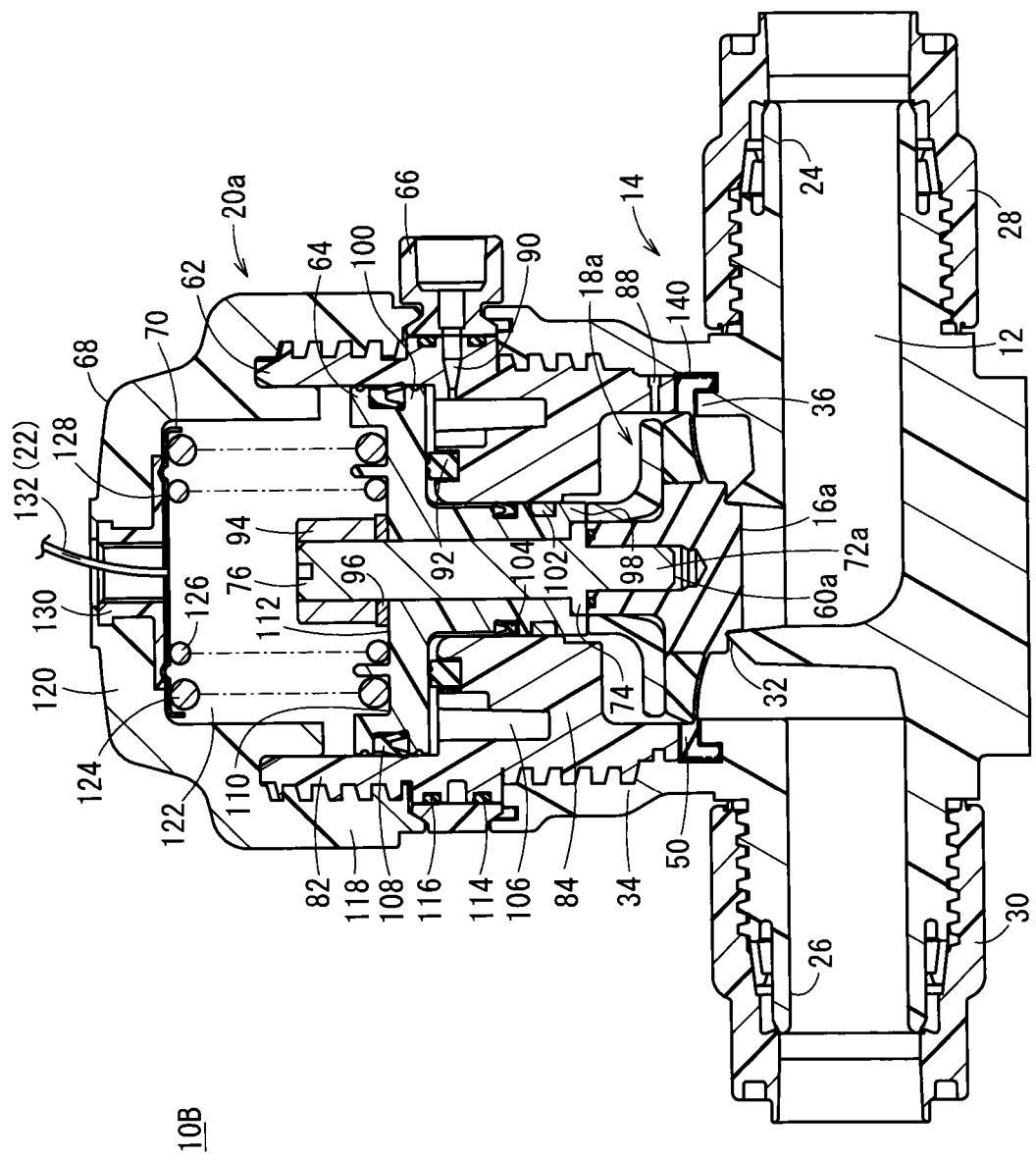
FIG. 5 is a vertical cross-sectional view of a valve apparatus according to a second embodiment of the present invention.
Figure 6:
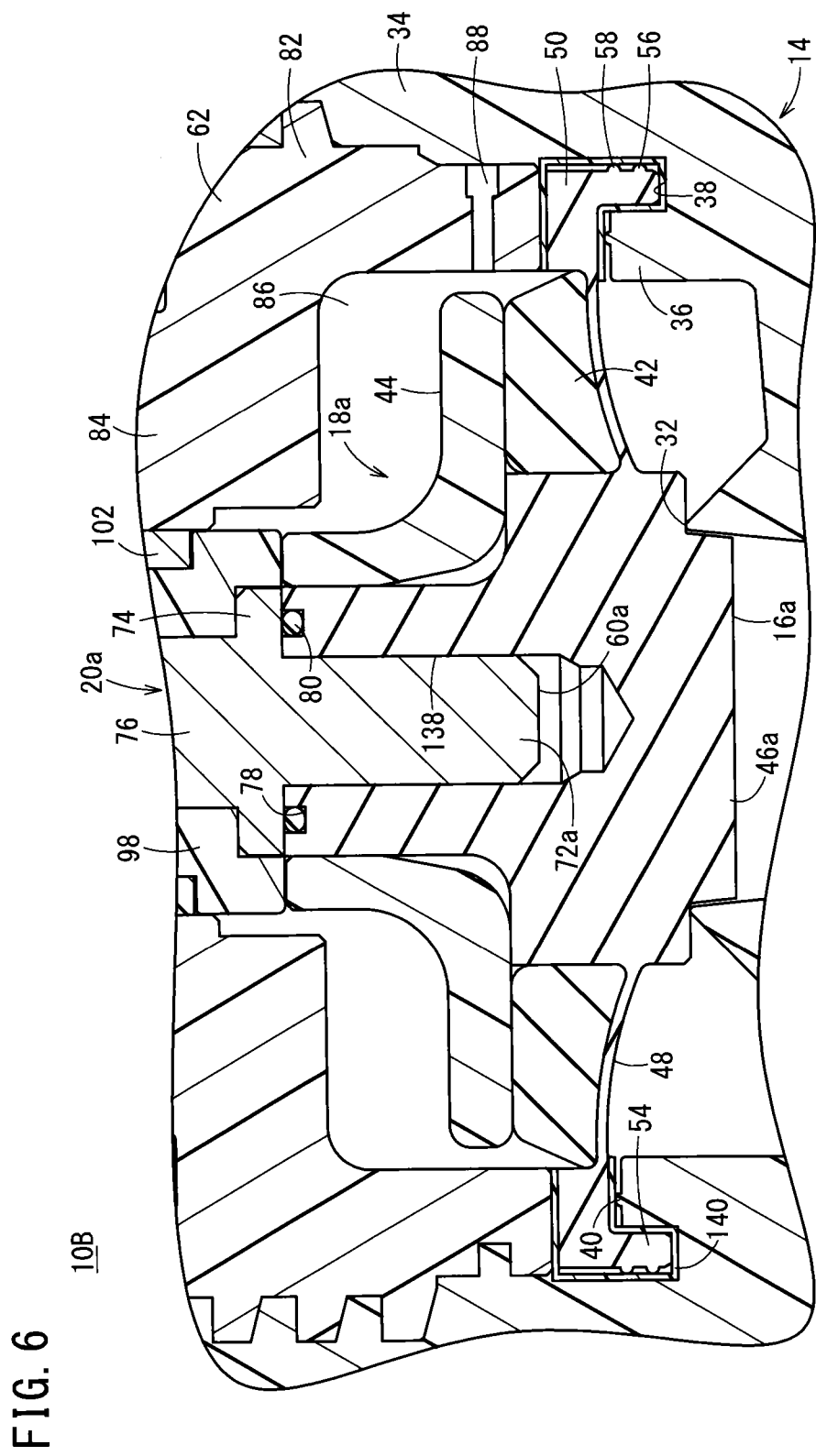
FIG. 6 is an enlarged cross-sectional view of a portion of the valve apparatus.
Figure 7:
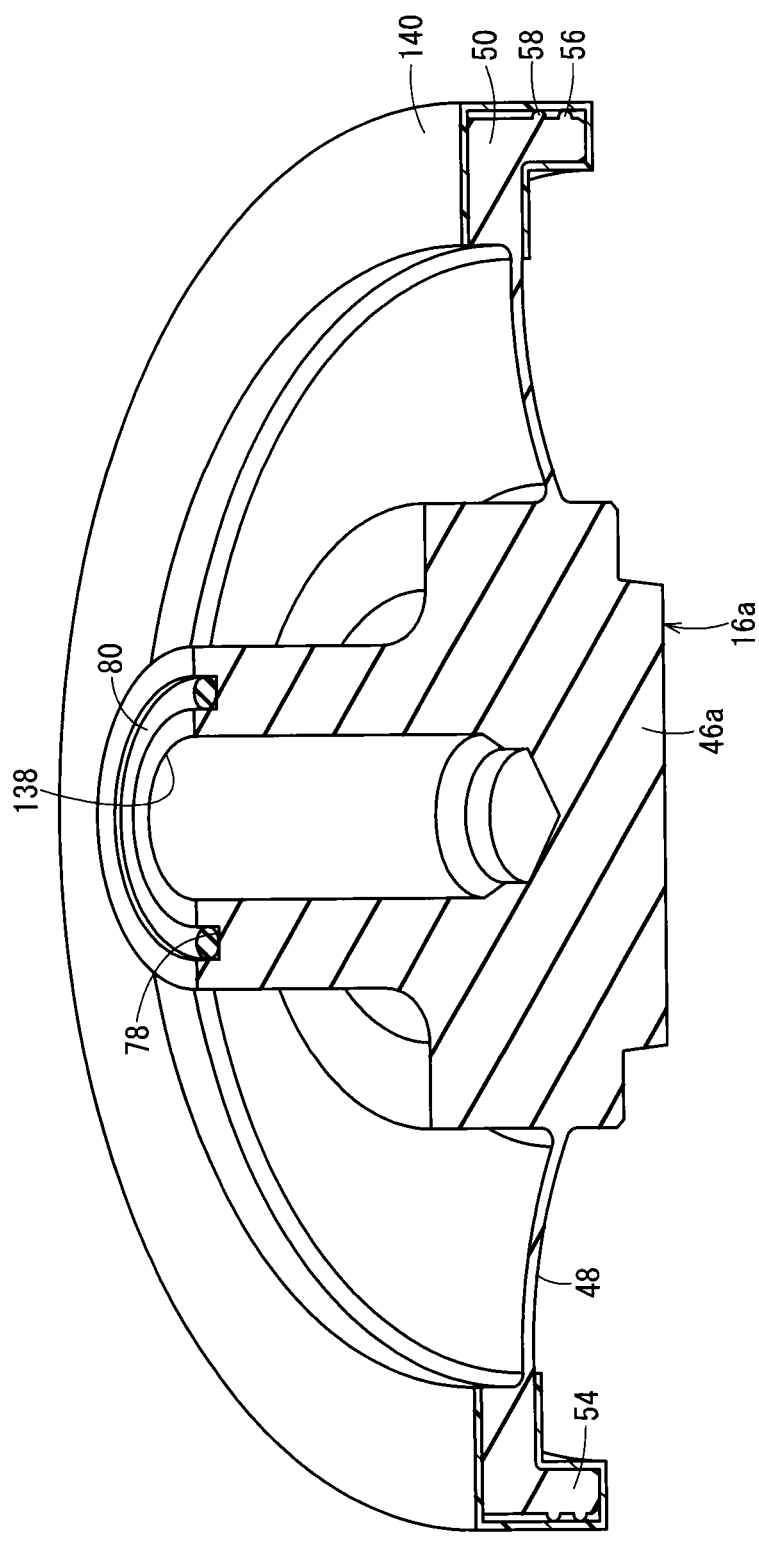
FIG. 7 is a perspective view partially shown in cross-section of a diaphragm and a conductive member shown in FIG. 5.

As shown in FIGS. 5 and 6, in the valve apparatus 10B, the structural configurations of the valve member 18a and the actuator 20a differ from those of the valve member 18 and the actuator 20 described above. In particular, on the boss section 46a of the diaphragm 16a that makes up the valve member 18a, a hole 138 is formed, which does not penetrate through the boss section 46a. Also, screw threads, which are formed on the outer surface of the first small diameter portion 72a of the conductive shaft 60a that constitutes the actuator 20a, are screw-engaged with threads that are engraved on the inner circumferential surface of the hole 138, to thereby fix the boss section 46a to the first small diameter portion 72a.

The valve apparatus 10B is further equipped with a ring-shaped conductive member 140, which is attached in covering relation to substantially the entire outer surface of the outer edge 50 of the diaphragm 16a. The conductive member 140 is formed, for example, by bending an annular plate, which is made of carbon fibers, along the cross-sectional shape of the outer edge 50 of the diaphragm 16a. However, the conductive member 140 is not limited to the example of being made of carbon fibers, and may be constituted by another conductive material, such as a metal material or the like, which is resistant to corrosion. A portion of the conductive member 140 is exposed to the fluid passage 12, and the conductive member 140 also is connected electrically in a state of surface contact with the retainer 62.

In the present embodiment, the retainer 62 and the wear ring 102 are made from a conductive material such as a metal material, a conductive resin, or the like. More specifically, in the present embodiment, the conductive member 140, the retainer 62, the wear ring 102, the piston 64, the first spring 124, the second spring 126, and the spring seat 128, respectively, are constituted from conductive materials and are connected electrically to each other. Therefore, the conductive member 140 is grounded by way of the ground wire 132.

According to the present embodiment, static electricity, which is generated on one surface of the diaphragm 16a, is led out to the ground wire 132 through the conductive member 140, the retainer 62, the wear ring 102, the piston 64, the first spring 124 (the second spring 126), and the spring seat 128. Therefore, accumulation of static electricity in the diaphragm 16a can be suppressed. Accordingly, dielectric breakdown of the membrane section 48 of the diaphragm 16a can be suppressed reliably with a simple structure, and a reduction in manufacturing costs can be achieved.

Further, depending on the type of pressure fluid that is used, cases exist in which static electricity is easily generated in the vicinity of the outer edge 50 of the diaphragm 16a. In the cases, such static electricity can be eliminated easily and efficiently from the diaphragm 16a by the conductive member 140.

Furthermore, with the present embodiment, the conductive member 140 can be disposed without the formation of through holes or the like in the outer edge 50 of the diaphragm 16a to which loads can easily be applied when the membrane section 48 of the diaphragm 16a is elastically deformed. Therefore, a reduction in the rigidity of the outer edge 50 of the diaphragm 16a can be avoided.

Furthermore, since the conductive member 140 is constituted by carbon fibers, static electricity that is generated in the diaphragm 16a can be guided efficiently to the retainer 62 through the conductive member 140.

The present embodiment is not limited to the structure described above. Instead of the conductive shaft 60a, the valve apparatus 10B may comprise a shaft that is constituted from a non-conductive material. In this case as well, the conductive member 140 can be grounded reliably and securely.

Third Embodiment

Figure 8:
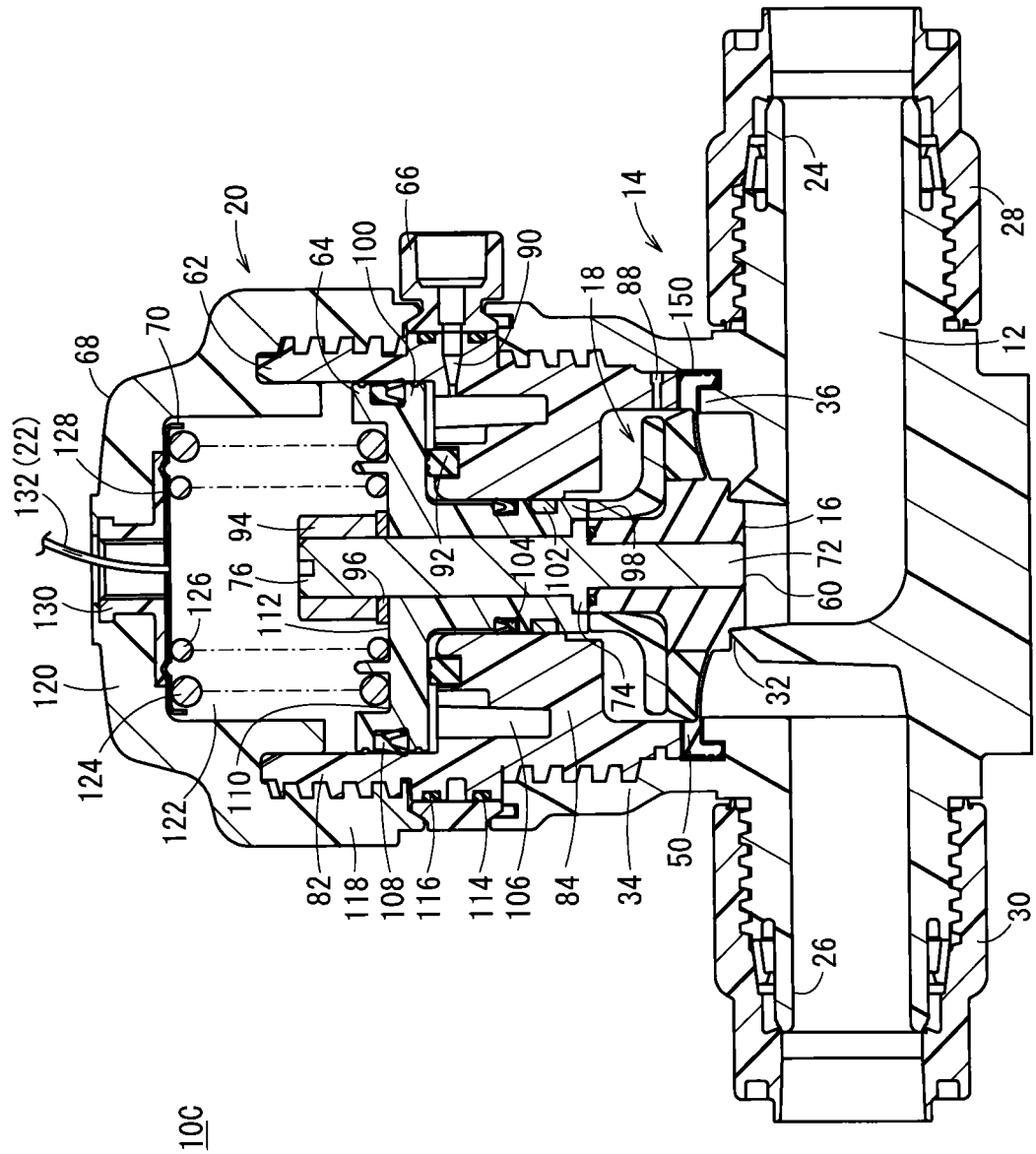
FIG. 8 is a vertical cross-sectional view of a valve apparatus according to a third embodiment of the present invention.
Figure 9:
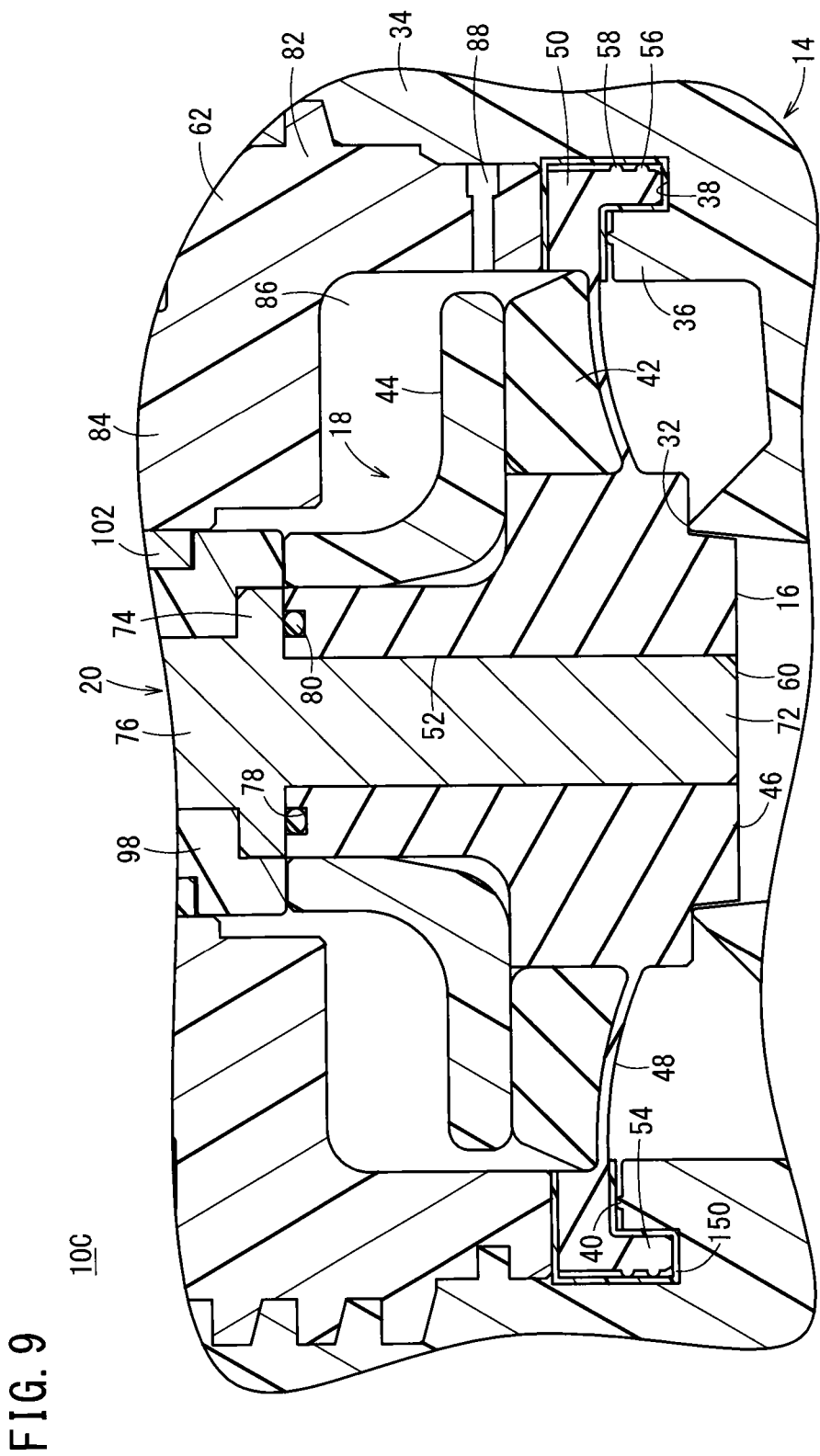
FIG. 9 is an enlarged cross-sectional view of a portion of the valve apparatus.

Next, a valve apparatus 10C according to a third embodiment of the present invention will be described with reference to FIGS. 8 and 9. As shown in FIGS. 8 and 9, the valve apparatus 10C is further equipped with a ring-shaped conductive member 150, which is attached in covering relation to substantially the entire outer surface of the outer edge 50 of the diaphragm 16. The conductive member 150 has the same material and shape as the conductive member 140 described above in connection with the second embodiment, and therefore, detailed description of the conductive member 150 is omitted.

In the present embodiment, the retainer 62 and the wear ring 102 are made from a conductive material such as a metal material, a conductive resin, or the like. More specifically, in the present embodiment, the conductive member 150, the retainer 62, the wear ring 102, the piston 64, the conductive shaft 60, the first spring 124, the second spring 126, and the spring seat 128, respectively, are constituted from conductive materials and are connected electrically to each other. Therefore, both the conductive member 150 and the conductive shaft 60 are grounded by way of the ground wire 132.

According to the present embodiment, static electricity, which is generated on one surface of the diaphragm 16, can be eliminated by both the conductive shaft 60 and the conductive member 150, respectively. More specifically, static electricity, which is generated due to friction between the diaphragm 16 and the valve seat 32, can be guided to the conductive shaft 60, and static electricity, which is generated in the vicinity of the outer edge 50 of the diaphragm 16, can be guided to the conductive member 150.

In addition, static electricity, which is guided to the conductive shaft 60, is further led out to the ground wire 132 through the piston 64, the first spring 124 (the second spring 126), and the spring seat 128. On the other hand, static electricity, which is guided to the conductive member 150, is further led out to the ground wire 132 through the retainer 62, the wear ring 102, the piston 64, the first spring 124 (the second spring 126), and the spring seat 128. Therefore, accumulation of static electricity in the diaphragm 16 can suitably be suppressed. Accordingly, with a simple structure, dielectric breakdown of the membrane section 48 of the diaphragm 16 can be suppressed more reliably.

Further, with the present embodiment, the conductive member 150 can be disposed without the formation of through holes or the like in the outer edge 50 of the diaphragm 16 to which loads can easily be applied when the membrane section 48 of the diaphragm 16 is elastically deformed. Therefore, a reduction in the rigidity of the outer edge 50 of the diaphragm 16 can be avoided.

Furthermore, since the conductive member 150 is constituted by carbon fibers, static electricity that is generated in the diaphragm 16 can be guided efficiently to the retainer 62 through the conductive member 150.

The valve apparatus according to the present invention is not limited to the above embodiments. Various changes and modifications may be made to the embodiments without departing from the scope of the invention as set forth in the appended claims. For example, the valve apparatus according to the present invention is not limited to a two-way valve, and may be of any type of multi-way valve such as a three-way valve, a four-way valve or the like. Further, the valve apparatus according to the present invention may be constituted as a solenoid valve.

What is claimed is:

1. A valve apparatus comprising:
    a body including a fluid passage that establishes communication between a first port and a second port and through which a pressure fluid flows;
    a diaphragm disposed displaceably in an interior of the body, and which opens and closes the fluid passage by separating away from a valve seat and by being seated on the valve seat, the diaphragm including a through hole formed substantially in a center of the diaphragm;
    a conductive shaft arranged in the through hole such that one end surface of the conductive shaft is exposed to the fluid passage; and
    a grounding member configured to ground the conductive shaft,
    wherein each of the body and the diaphragm is formed from a non-conductive material.

2. The valve apparatus according to claim 1, wherein the conductive shaft includes:
    a small diameter portion arranged in the through hole; and
    a large diameter portion disposed on another end of the small diameter portion, and
    wherein an annular sealing projection, which contacts one surface of the large diameter portion and forms a seal between the large diameter portion and the diaphragm, is formed on a surface of the diaphragm.

3. The valve apparatus according to claim 1, wherein the conductive shaft includes:
   a small diameter portion arranged in the through hole; and
   a large diameter portion disposed on another end of the small diameter portion, and
   wherein an annular resilient member, which forms a seal between the large diameter portion and the diaphragm, is interposed between a surface of the diaphragm and one surface of the large diameter portion.

4. The valve apparatus according to claim 1, wherein the conductive shaft is made of polyphenylene sulfide containing carbon fibers.

5. The valve apparatus according to claim 1, wherein the conductive shaft is made of a metal material having corrosion resistance.

6. The valve apparatus according to claim 1, further comprising:
   a conductive member disposed on an outer surface of an outer edge of the diaphragm; and
   a conductive retainer that retains the outer edge of the diaphragm in a condition of being electrically connected with the conductive member,
   wherein the grounding member grounds the conductive member through the retainer, and
   a portion of the conductive member is exposed to the fluid passage.

7. The valve apparatus according to claim 6, wherein the conductive member is made of carbon fibers.

8. A valve apparatus comprising:
   a body including a fluid passage that establishes communication between a first port and a second port and through which a pressure fluid flows;
   a diaphragm disposed displaceably in an interior of the body, and which opens and closes the fluid passage by separating away from a valve seat and by being seated on the valve seat;
   a conductive member disposed on an outer surface of an outer edge of the diaphragm;
   a conductive retainer that retains the outer edge of the diaphragm in a condition of being electrically connected with the conductive member; and
   a grounding member configured to ground the conductive member through the retainer,
   wherein each of the body and the diaphragm is formed from a non-conductive material, and
   a portion of the conductive member is exposed to the fluid passage.

9. The valve apparatus according to claim 8, wherein the conductive member is made of carbon fibers.

* * * * *